US009592830B2

(12) United States Patent
Roos et al.

(10) Patent No.: US 9,592,830 B2
(45) Date of Patent: Mar. 14, 2017

(54) PREDICTIVE VEHICLE PULSE AND GLIDE CONTROL

(71) Applicant: Scania CV AB, Södertälje (SE)

(72) Inventors: Fredrik Roos, Segeltorp (SE); Mikael Ögren, Södertälje (SE); Gustav Norman, Hägersten (SE); Mengxi Wu, Stockholm (SE)

(73) Assignee: SCANIA CV AB, Södertälje (SE)

( * ) Notice: Subject to any disclaimer, the term of this patent is extended or adjusted under 35 U.S.C. 154(b) by 25 days.

(21) Appl. No.: 14/441,425

(22) PCT Filed: Oct. 18, 2013

(86) PCT No.: PCT/SE2013/051216
§ 371 (c)(1),
(2) Date: May 7, 2015

(87) PCT Pub. No.: WO2014/074050
PCT Pub. Date: May 15, 2014

(65) Prior Publication Data
US 2016/0214606 A1    Jul. 28, 2016

(30) Foreign Application Priority Data

Nov. 12, 2012    (SE) ........................................ 1251282

(51) Int. Cl.
B60W 10/10    (2012.01)
B60W 30/14    (2006.01)
(Continued)

(52) U.S. Cl.
CPC .......... B60W 30/143 (2013.01); B60W 10/02 (2013.01); B60W 10/06 (2013.01);
(Continued)

(58) Field of Classification Search
CPC ... B60K 41/22; B60W 30/1884; B60W 10/10; B60W 2030/1809; B60W 30/143;
(Continued)

(56) References Cited

U.S. PATENT DOCUMENTS

2010/0324793 A1* 12/2010 Winkel ................... F16H 61/21
701/65
2012/0083984 A1    4/2012 Johansson et al.
(Continued)

FOREIGN PATENT DOCUMENTS

DE    10/2004/017115 A1    10/2005
DE    10/2008/007995 A1    8/2009
(Continued)

OTHER PUBLICATIONS

English Translation of DE102004017115; http://translationportal.epo.org; Jul. 26, 2016.*
(Continued)

Primary Examiner — Roger Pang
(74) Attorney, Agent, or Firm — Moore & Van Allen PLLC; W. Kevin Ransom

(57) ABSTRACT

Disclosed are a method and a control system adapted to making it possible to use, or prolong a use of, a higher transmission mode in a vehicle. The control system comprises a simulation unit configured for simulating at least one future speed profile for an actual speed for the vehicle along a section of road ahead of the vehicle, which simulation is conducted at a time when the section of road is still ahead of the vehicle, and is based on information related to a gradient of the section of road. The system further comprises an evaluation unit configured for evaluating whether a raising of an actual speed for the vehicle is appropriate to achieving the making possible or prolongation, which evaluation is based on the simulation of at least one future speed
(Continued)

profile, and a use unit configured for using the evaluation during control of the actual speed.

29 Claims, 8 Drawing Sheets

(51) Int. Cl.
*B60W 50/00* (2006.01)
*B60W 10/02* (2006.01)
*B60W 10/06* (2006.01)
*B60W 30/18* (2012.01)
B60W 10/04 (2006.01)
B60W 30/188 (2012.01)

(52) U.S. Cl.
CPC ...... *B60W 10/10* (2013.01); *B60W 30/18072* (2013.01); *B60W 50/0097* (2013.01); *B60K 41/22* (2013.01); *B60W 30/1884* (2013.01); *B60W 2030/1809* (2013.01); *B60W 2030/18081* (2013.01); *B60W 2050/0089* (2013.01); *B60W 2510/104* (2013.01); *B60W 2520/10* (2013.01); *B60W 2550/142* (2013.01); *B60W 2550/143* (2013.01); *B60W 2550/402* (2013.01); *B60W 2710/021* (2013.01); *B60W 2710/1005* (2013.01); *B60W 2720/103* (2013.01); *Y02T 10/52* (2013.01); *Y02T 10/84* (2013.01); *Y10T 477/65* (2015.01); *Y10T 477/676* (2015.01)

(58) Field of Classification Search
CPC ..... B60W 30/18072; B60W 2550/142; B60W 2510/104; B60W 2520/10
USPC .................................................. 701/58, 65
See application file for complete search history.

(56) References Cited

U.S. PATENT DOCUMENTS

| 2012/0220424 | A1* | 8/2012 | Staudinger | B60W 30/16 477/80 |
| 2014/0088847 | A1* | 3/2014 | Abdul-Rasool | B60W 10/02 701/67 |
| 2015/0321670 | A1* | 11/2015 | Johansson | B60W 50/0097 701/94 |
| 2015/0362065 | A1* | 12/2015 | Johansson | B60W 30/18072 701/65 |

FOREIGN PATENT DOCUMENTS

| DE | 10/2008/023135 A1 | 11/2009 | |
| DE | 10/2009 021019 A1 | 11/2010 | |
| WO | WO-2011/076226 A1 | 6/2011 | |
| WO | WO 2013191614 A1 * | 12/2013 | ............. B60K 31/00 |

OTHER PUBLICATIONS

English Translation of DE102009021019; http://translationportal.epo.org; Jul. 26, 2016.*
English Translation of DE102008023135; http://translationportal.epo.org; Jul. 26, 2016.*
International Search Report for PCT/SE2013/051216 dated Feb. 18, 2014.
International Preliminary Report for PCT/SE2013/051216 dated Feb. 3, 2015.

* cited by examiner

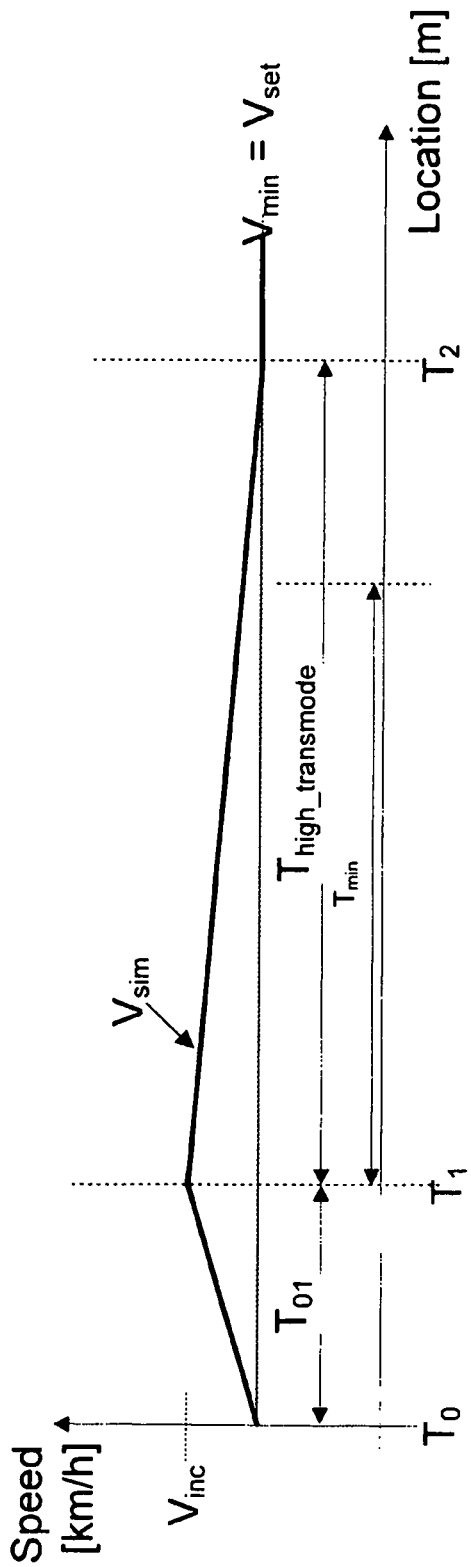
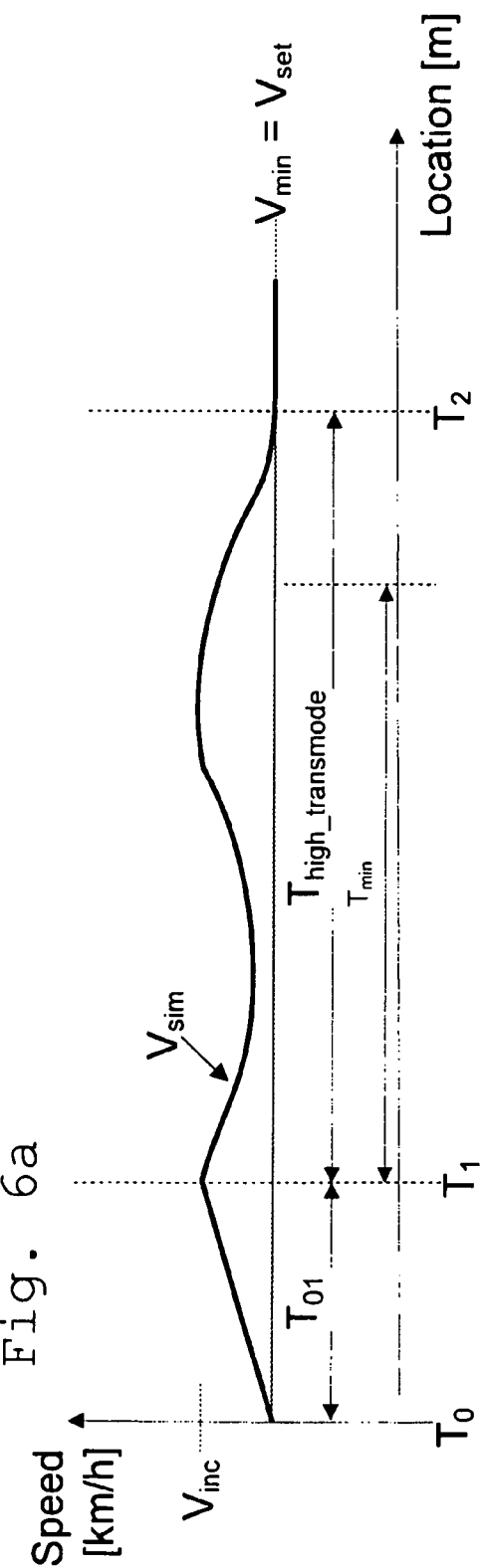

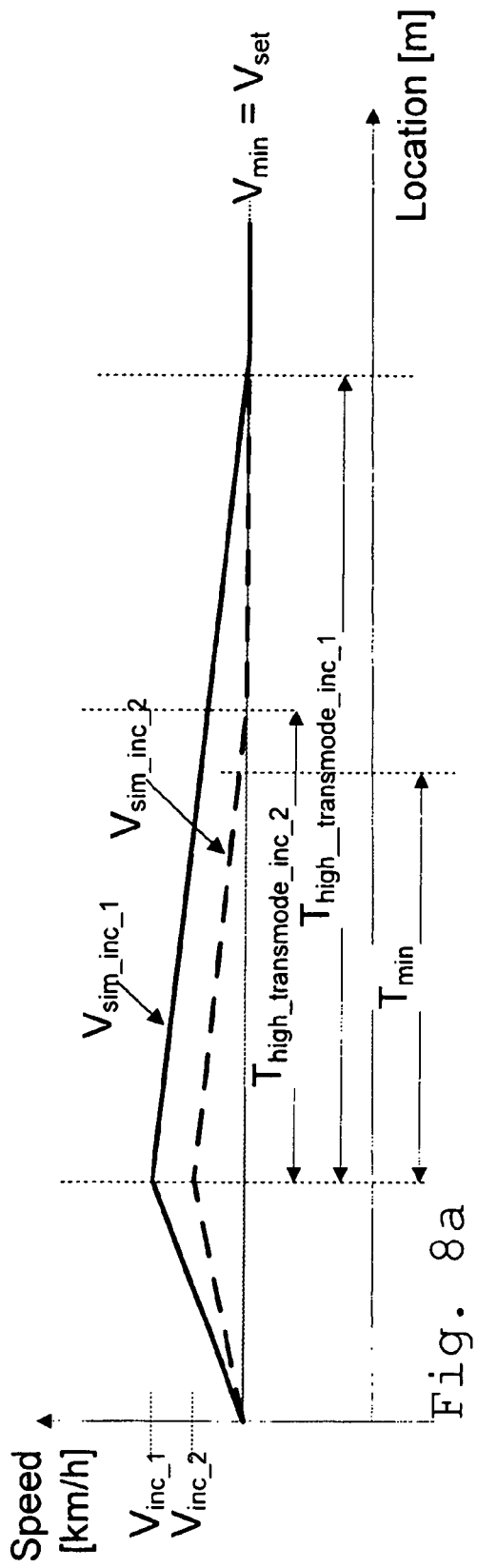
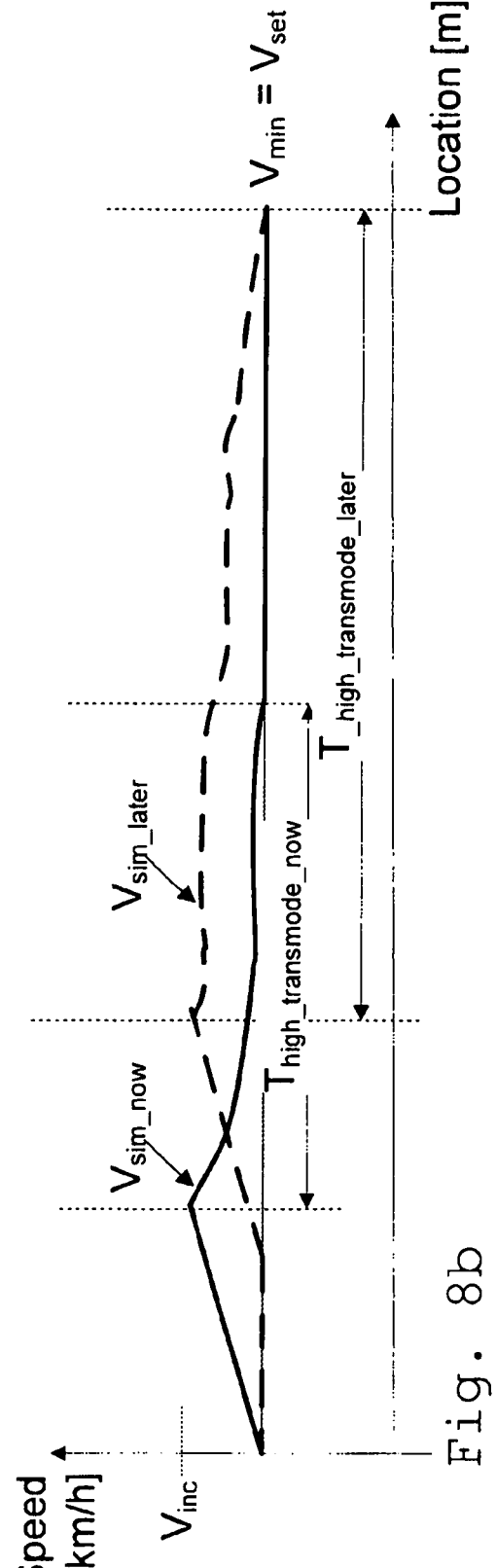
Fig. 8a
Fig. 8b

PREDICTIVE VEHICLE PULSE AND GLIDE CONTROL

TECHNICAL FIELD

The present invention relates to a method, a system, and computer program product for making it possible to use, or prolong a use of, a higher transmission mode in a vehicle.

BACKGROUND

The following background description represents a description of the background to the present invention and therefore need not necessarily represent prior art.

The cost of fuel for motor vehicles, e.g. cars, trucks and buses, represents a significant expense for their owner or user. In the case for example of a haulage company, apart from the procurement cost of a vehicle, the main expense items for its routine operation are pay for the driver, repair and maintenance costs and the cost of fuel for the vehicle's propulsion. The fuel cost may here very greatly affect the company's profitability. A wide variety of different systems have therefore been developed for reducing fuel consumption, e.g. fuel-efficient engines and fuel-economising cruise controls.

Figure 1:
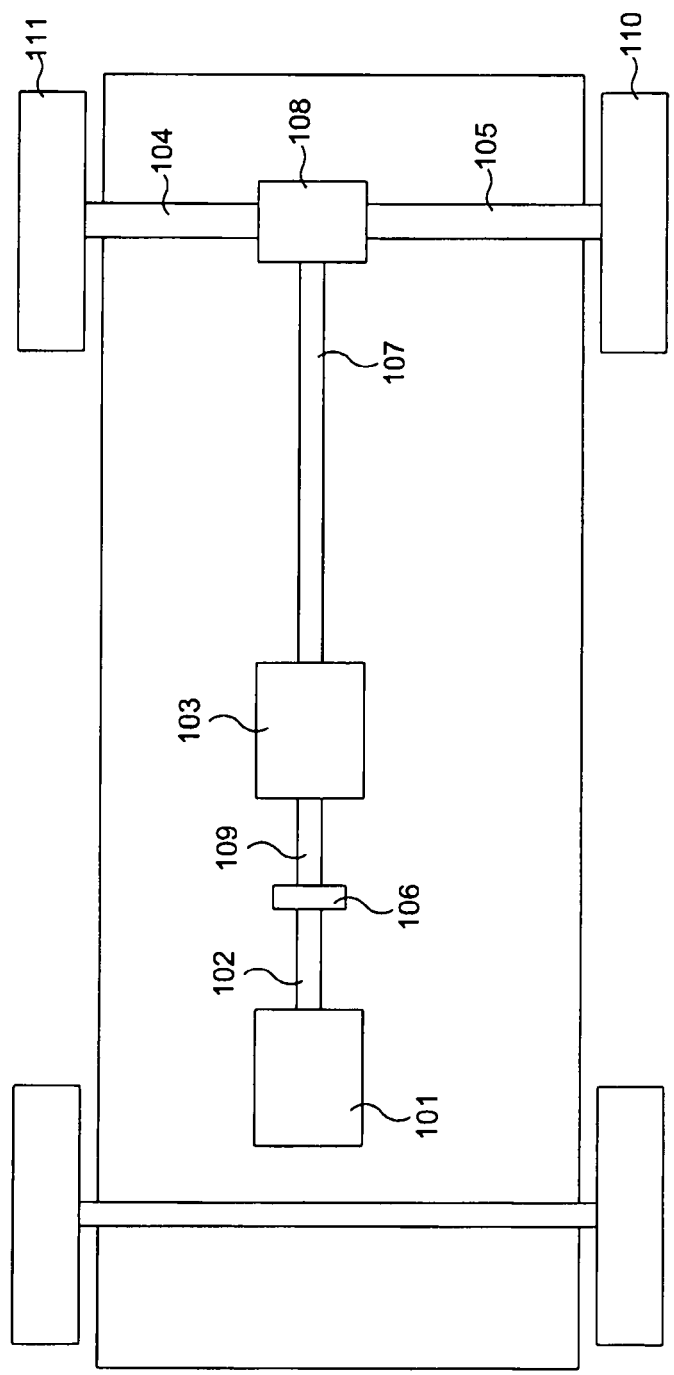

FIG. 1 depicts schematically a power train of a vehicle 100. The power train comprises a combustion engine 101 which in a conventional way is connected, via an output shaft 102 from the engine, usually via a flywheel, to an input shaft 109 of a gearbox 103 via a clutch 106. The clutch may for example take the form of an automatically operated clutch and may be operated by the vehicle's control system via a control unit 900 (FIG. 9), which may also operate the gearbox 103.

The gearbox 103 is here illustrated schematically as a unit but might physically also take the form of a plurality of interacting gearboxes, e.g. a range gearbox, a main gearbox and a split gearbox, which are situated along the vehicle's power train. The gearbox may comprise a suitable number of gear positions. Today's gearboxes for heavy vehicles usually have twelve gears for travelling forwards, two reverse gears and a neutral gear position. If the gearbox 130 physically comprises two or more divisional gearboxes as above, these twelve forward gears are divided into two in the range gearbox, three in the main gearbox and two in the split gearbox, making a total of twelve gear positions (2*3*2=12). The vehicle 100 further comprises driveshafts 104, 105 which are connected to its tractive wheels 110, 111 and are driven by an output shaft 107 from the gearbox 103 via an axle gear 108, e.g. a conventional differential.

The vehicle 100 further comprises various different brake systems, e.g. a conventional service brake system which may for example comprise brake discs with associated brake linings (not depicted) adjacent to each wheel. The engine 101 may be controlled on the basis of instructions from a cruise control in order to maintain a constant actual vehicle speed and/or to vary the actual vehicle speed so as to achieve optimized fuel consumption within reasonable speed limits. The engine 101 may also be controlled by a driver of the vehicle.

BRIEF DESCRIPTION OF THE INVENTION

On for example downhill runs or in situations where the vehicle has to reduce its actual speed, fuel savings have historically been made by reduced demand for positive engine torque or by dragging. Reduced demand for positive engine torque means that the propulsive force in the direction of movement which the combustion engine delivers via the tractive wheels is decreased, e.g. by reducing the fuel injection into the engine 101 and thereby reducing the fuel consumption.

Dragging means running the vehicle with the power train closed, i.e. with the combustion engine 101 connected to the vehicle's tractive wheels 110, 111 while at the same time the fuel supply to the engine 101 is switched off. An advantage of this type of operation is that since the fuel supply to the engine is switched off the engine's consumption will likewise be zero. However, this type of operation also means that the combustion engine 101 will be driven by the vehicle's tractive wheels via the power train, a state called "dragging", whereby the engine's internal losses result in a braking action, i.e. the vehicle being engine-braked.

Reducing the engine torque demanded and dragging certainly lower the fuel consumption but this lowering is not always optimized partly because the reduced engine torque nevertheless most often results in more fuel consumption than necessary and partly because the dragging also results in engine braking of the vehicle, which is not economical on fuel.

An object of the present invention is to further reduce the vehicle's fuel consumption.

This object is achieved by the aforesaid method, system, and computer program product for making it possible to use, or prolong a use of, a higher transmission mode in a vehicle.

The present invention achieves the object, i.e. of reducing the fuel consumption, by allowing for as long a time as possible a gear choice which results in the lowest possible engine speed and hence maximum fuel saving. The invention makes it possible for freewheeling to be regarded as part of the vehicle's gear choice. The result is a further degree of freedom for effecting a lowering of the engine speed, a fact which is utilized according to the invention.

The present invention makes it possible to prolong a use of a higher transmission mode as compared with what has been possible according to previously known methods. Alternatively, it makes it possible to use a higher transmission mode in driving situations where previous known methods do not make this possible. In this specification the term "transmission mode" covers gear positions in the gearbox and freewheeling.

The object of making it possible to use the higher transmission mode and/or prolong its use is to keep the engine speed down as low as possible for as long a time as possible, thereby lowering the average engine speed and thereby reducing the total fuel consumption.

One or more simulations of future speed profiles $v_{sim}$ are conducted for an actual speed for the vehicle, with the result that the system has very good control over how the vehicle will behave along the section of road ahead of the vehicle. This means that choices about raising the actual vehicle speed, followed by changing to a higher transmission mode, can be made which will intuitively seem correct to a driver of the vehicle. The amount of use of the automatic gear choice and/or freewheeling function will thus further increase, with the result that fuel-saving freewheeling and/or upshifts will lower the total fuel consumption.

The present invention can be implemented with little additional complexity on board the vehicle, since the invention can use data already available in other systems of the vehicle, e.g. road gradient information to which the vehicle's cruise control has access.

The present invention may be employed both in pedal operation, i.e. with the driver him/herself regulating the demand for torque from the engine, and in cruise control operation. Pedal operation here and in this specification means using substantially any kind of control element suited to regulating the torque demand, e.g. an accelerator pedal or a manual acceleration device.

BRIEF LIST OF DRAWINGS

Figure 2:
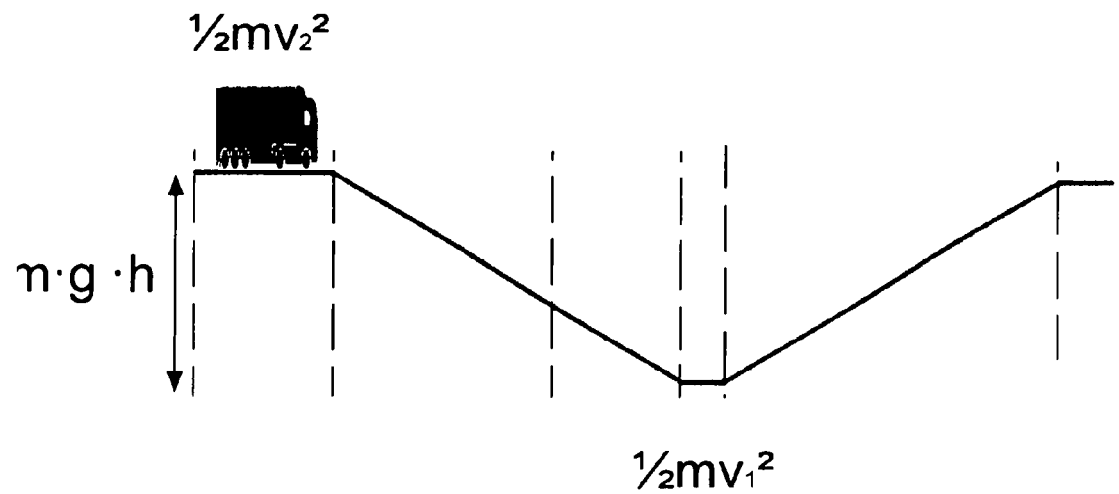
Figure 3:
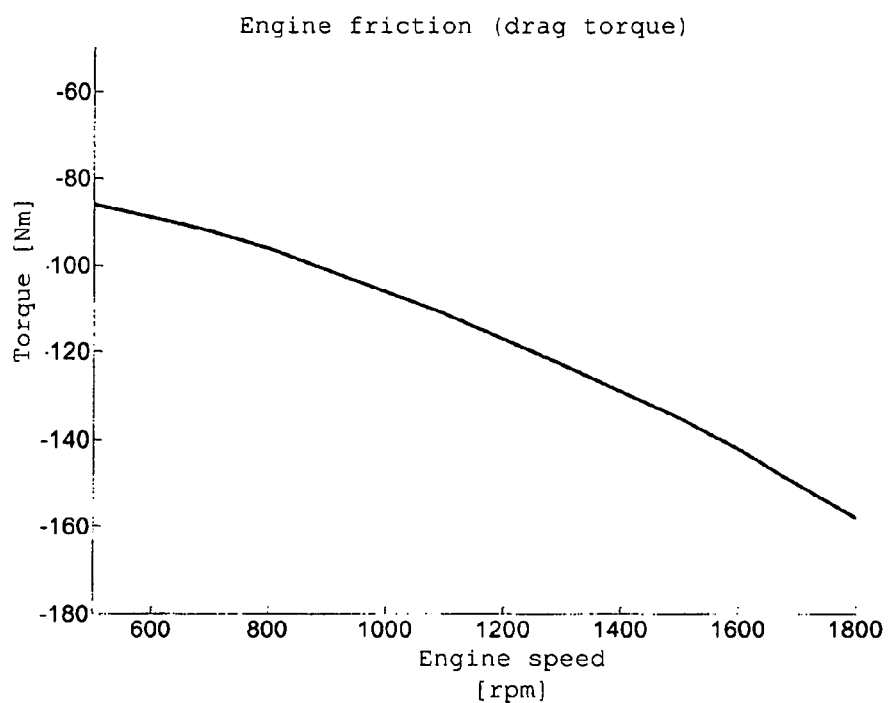
Figure 4:
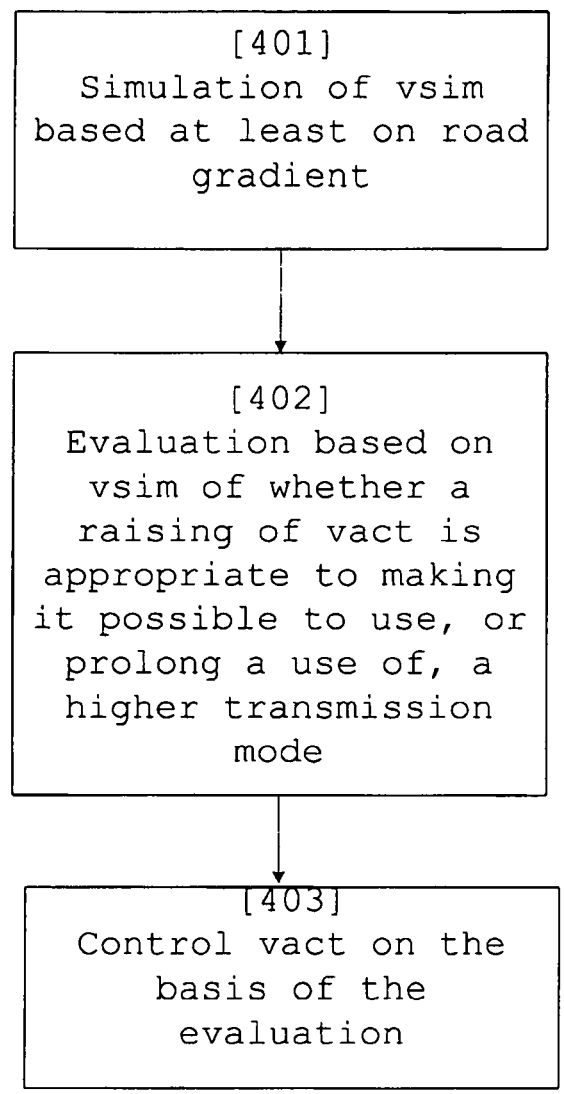
Figure 5:
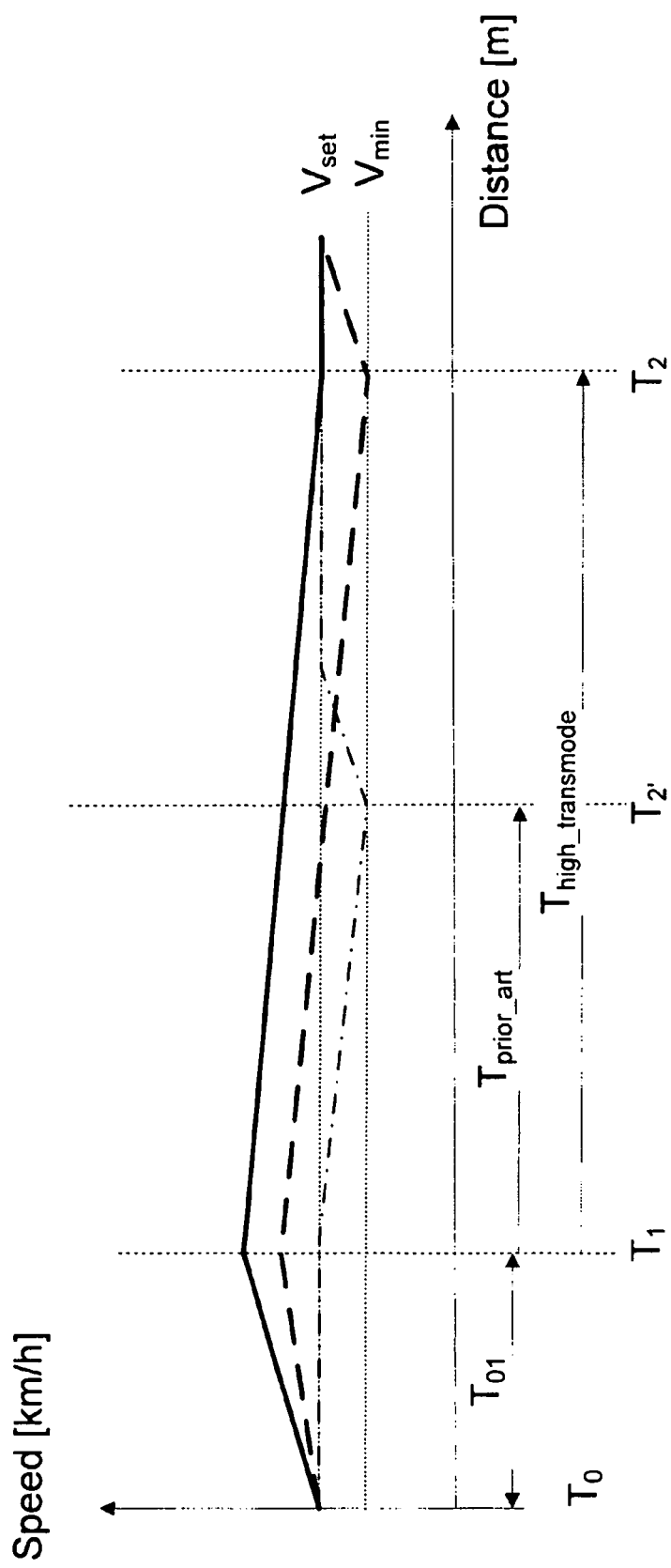
Figure 7:
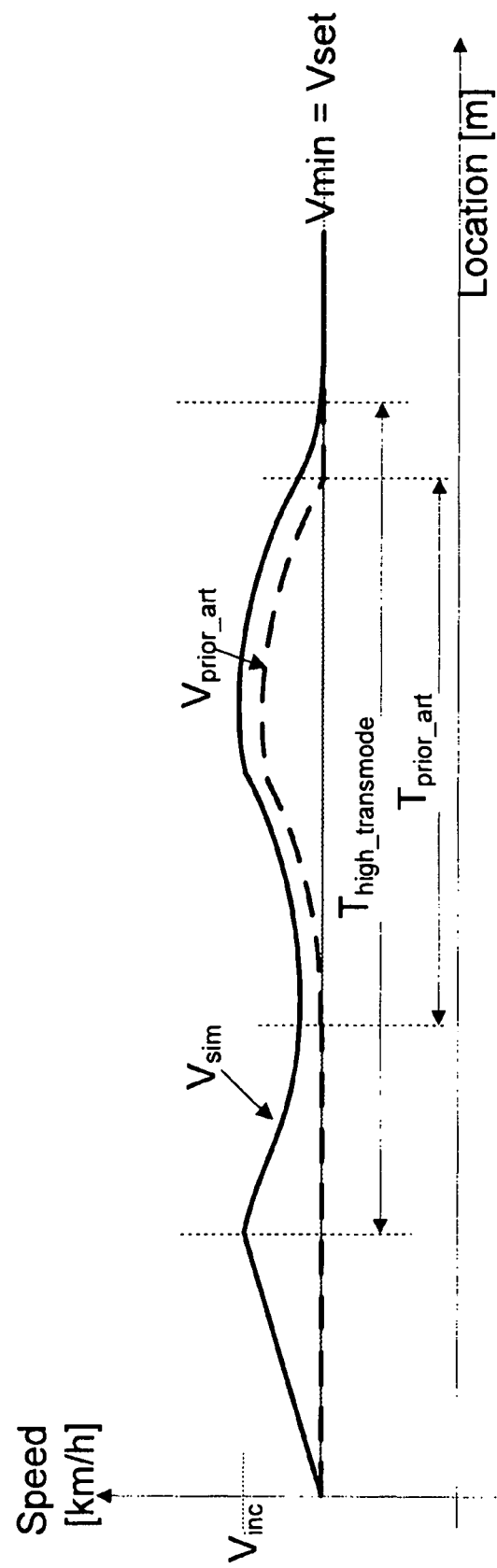
Figure 9:
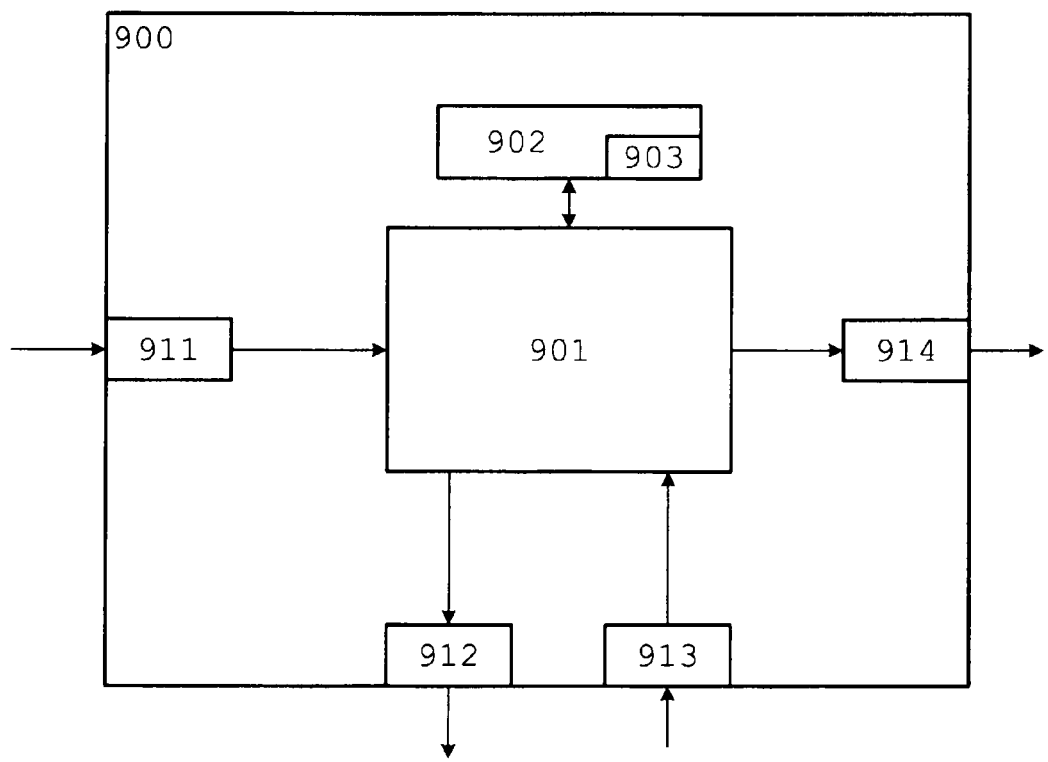

The invention is explained in more detail below with reference to the attached drawings, in which the same reference notations are used for similar items, and FIG. 1 schematically depicts parts of an example of a vehicle, FIG. 2 depicts schematically a driving situation, FIG. 3 is a diagram of engine friction as a function of engine speed, FIG. 4 is a flowchart for the method according to the invention, FIG. 5 depicts an example of a simulation, FIGS. 6a-b depict examples of simulations according to the invention, FIG. 7 depicts an example of a simulation according to the invention and a simulation according to prior art, FIG. 8 depicts an example of a number of simulations according to the invention, and FIG. 9 depicts a control unit according to the invention.

DESCRIPTION OF PREFERRED EMBODIMENTS

FIG. 2 depicts schematically an example of a driving situation on a downhill run where a higher transmission mode may be employed to lower the fuel consumption. A higher transmission mode may also be employed in other driving situations, e.g. during a speed decrease which may take place on level roads, but for instructional reasons the driving situation in FIG. 2 will be used to describe the principles applied by the invention.

For the vehicle in FIG. 2 it is possible to establish for the driving situation an energy relationship $$mgh = (\tfrac{1}{2}mv_2^2 - \tfrac{1}{2}mv_1^2) + (F_{air} + F_{rr} + F_{eng} + F_{gh} + F_{axle/nav}) \cdot s \qquad (\text{eq.1})$$

in which
mgh is the vehicle's potential energy,
½ $mv_2^2$ is the vehicle's kinetic energy at the top of the hill,
½ $mv_1^2$ is the vehicle's kinetic energy at the bottom of the hill,
$F_{air}$ is the vehicle's air resistance,
$F_{rr}$ is the vehicle's rolling resistance,
$F_{eng}$ is the engine friction,
$F_{gh}$ is the gearbox friction,
$F_{axle/nav}$ is friction in rear axles, seals and wheel bearings, and
s is the distance travelled between the top and bottom of the hill.

As may be seen in equation 1, various forces $F_{air}$, $F_{rr}$, $F_{eng}$, $F_{gh}$ and $F_{axle/nav}$ work against the movement of the vehicle.

FIG. 3 depicts an example of engine friction for a truck engine. It shows that the negative torque corresponding to the engine friction $F_{eng}$, which works against the movement of the vehicle, increases with increased speed of the engine 101 (it should be noted that the y axis has a negative slope in FIG. 3). Conversely, decreasing the speed of the engine reduces the amount of engine friction $F_{eng}$, i.e. it reduces the negative torque, a fact which is utilized by the present invention.

According to the present invention, using a higher transmission mode, i.e. upshift or freewheeling from a lower transmission mode used at the time of the simulations, goes on for a longer period of time than allowed by previously known solutions if this results in a fuel saving at the same time as having substantially no adverse effects upon the vehicle's propulsion.

In this specification an upshift further means that a higher possible gear position in the gearbox 103 is chosen, this higher gear position being physical, i.e. in the form of one of the regular gears in the gearbox. This higher gear position also means that the engine 101 runs at a lower speed. Freewheeling in this specification means that the vehicle's engine is disconnected from its tractive wheels 110, 111, so the power train is open. This disconnection of the tractive wheels from the engine, also called opening of the power train, may for example be effected by putting the gearbox 103 into a neutral state or by opening the clutch 106. This means that during the freewheeling substantially no power is transmitted from the engine 101 to the tractive wheels 110, 111. Disconnection of the engine 101 from the tractive wheels 110, 111 when the vehicle 100 is in motion is therefore referred to in this specification as freewheeling and may also be regarded as a highest theoretical/imaginary gear position for the power train. An opening of the clutch and/or the neutral position for the gearbox may therefore be regarded as a highest theoretical/imaginary gear position for the power train. In this specification, the term "freewheeling" also covers one of a plurality of prime movers of a vehicle, e.g. in a hybrid vehicle, being driven by the tractive wheels 110. It thus covers for example a mode of operating a hybrid vehicle whereby a combustion engine is disconnected from the tractive wheels 110 but an electric motor may continue to transmit power to the tractive wheels.

If freewheeling by opening the clutch and/or engaging neutral gear position is considered appropriate, the power train therefore has a number of physical gear positions, e.g. twelve in number, implemented in the gearbox 103, and at least one theoretical further gear position which is higher than the physical gear positions in the gearbox and entails opening the clutch and/or engaging neutral gear position in the gearbox 103 for at least one prime mover of the vehicle 100.

In this specification, the term "using a higher transmission mode" covers an upshift to a higher gear position for the gearbox and/or the power train, i.e. a mode of operation which comprises freewheeling, running with maximum torque in the higher transmission mode (the higher gear position), running with dragging in the higher transmission mode (the higher gear position) or running according to any desired torque profile in the higher transmission mode (the higher gear position).

An upshift causes the forces which work against the movement of the vehicle to decrease, since the amount of engine friction $F_{eng}$ decreases with decreasing engine speed, as also depicted in FIG. 3. An upshift may therefore lower the fuel consumption by reducing the resistance to the vehicle's movement.

Freewheeling causes the forces which work against the movement of the vehicle to decrease considerably, since the amount of engine friction $F_{eng}$ then decreases to a value substantially equal to zero (0). Freewheeling may therefore considerably lower the fuel consumption through this decrease in the resistance to the vehicle. In certain freewheeling situations, however, the engine has to be supplied with idling fuel to prevent its stopping, whereas in other situations the engine may be allowed to stop.

This means that from a fuel perspective it is often more advantageous to run the vehicle with the power train open, i.e. during freewheeling, than with dragging, i.e. with the power train closed while at the same time the fuel supply to the engine 101 is switched off. The reason for this is that the limited amount of fuel required to keep the combustion engine running when it is disconnected is counterbalanced by the vehicle being able to continue to freewheel with the engine disconnected for a longer distance, e.g. beyond the end of a downhill run. This is due inter alia to the fact that the vehicle will reach a higher speed when for example travelling running downhill with the engine disconnected than when it is run with the power train closed and no fuel supply.

Moreover, the force which works against the vehicle's movement during freewheeling will be less when the combustion engine is disconnected from the driveshaft, since there will then be no engine brake force working against the vehicle's forward movement. This means that the vehicle will decelerate more slowly when for example it reaches the end of a downhill run, so freewheeling may often continue for a relatively long distance beyond for example the end of a downhill run. The result is a considerable decrease in fuel consumption.

The freewheeling described above refers to a conventional vehicle with a combustion engine, but the invention may also be employed on a vehicle with two or more prime movers, e.g. a hybrid vehicle which has a combustion engine and an electric motor. As mentioned above, freewheeling for a vehicle with two or more prime movers entails the engine being disconnected from the tractive wheels, i.e. the engine freewheeling, and the vehicle being powered by the electric motor alone. In this case the vehicle may, in this embodiment of the present invention, be freewheeled, i.e. the combustion engine may be disconnected from the tractive wheels, along more road sections owing to the raising of the actual speed $v_{act}$ than would be possible without the raising. During this freewheeling the vehicle's operation may be supported by power from the electric motor.

The present invention determines whether a raising of the actual speed $v_{act}$ for the vehicle, i.e. a raising of the speed at which the vehicle physically moves relative to the ground, may mean that a higher transmission mode can be used after the raising, or be used for a longer time, than if the raising had not been effected. This is described in more detail below.

To make it possible to decide this, one or more future speed profiles $v_{sim}$ for the vehicle's actual speed are simulated for a section of road ahead of the vehicle. The simulation is therefore based on the vehicle's current location and situation, looks forward along the section of road and is based on its gradient. In one embodiment of the invention one or more of these simulations comprise at least one simulation of a raising of the actual speed $v_{act}$.

For example, the simulation may be conducted on board the vehicle at a predetermined rate, e.g. at a rate of 1 Hz, which means that a new simulation result is provided every second. The section of road for which the simulation is conducted represents a predetermined distance ahead of the vehicle, e.g. it might be 1 km long. The section of road may also be regarded as a horizon ahead of the vehicle, for which the simulation is to be conducted.

In addition to the aforesaid parameter of road gradient, the simulation may also be based on one or more from among a transmission mode, a mode of operation, a current actual vehicle speed, at least one engine characteristic, e.g. maximum and/or minimum engine torque, a vehicle weight, an air resistance, a rolling resistance, a gear ratio in the gearbox and/or the power train, and a wheel radius.

The road gradient on which the simulations are based may be obtained in various different ways. It may be determined on the basis of map data, e.g. from digital maps containing topographical information, in combination with positioning information, e.g. GPS (global positioning system) information. The positioning information may be used to determine the vehicle's location relative to the map data so that the road gradient can be extracted from the map data.

Various present-day cruise control systems use map data and positioning information. Such systems may then provide the system for the present invention with map data and positioning information, thereby minimising the additional complexity involved in determining the road gradient.

The road gradient on which the simulations are based may be obtained on the basis of a map in conjunction with GPS information, from radar information, from camera information, of information from another vehicle, from positioning information and road gradient information stored previously on board, or from information obtained from traffic systems related to said section of road. In systems where there is information exchange between vehicles, road gradients estimated by one vehicle may also be made available to other vehicles, either directly or via an intermediate unit such as a data base or the like.

The simulations are conducted on the basis of an assumption about an at least partial use of a higher transmission mode, i.e. a higher transmission mode than that used at the time of the simulations. As will be described in more detail below, a higher transmission mode may for example comprise freewheeling or a higher gear position for the vehicle's gearbox 103, the freewheeling being for example effected by opening the clutch 106 or by engaging a neutral gear. A future speed profile $v_{sim}$ for the vehicle's actual speed is therefore simulated at least partly for a specific higher gear in the gearbox, for an open clutch or for a neutral gear in the gearbox. Two or more simulations may be conducted in parallel or sequentially so that simulations for all relevant transmission modes are made before evaluating the simulations and deciding which transmission mode should be used. One or more of the simulations of future speed profiles $v_{sim}$ comprise also a raising of the actual speed $v_{act}$ before the change to a higher transmission mode is made from a lower transmission mode used at the time of the simulation.

For each gear in the gearbox 103 there are related parameters such as gear ratio, efficiency and maximum permissible torque. One or more parameters may serve as input data for simulating the future speed profile $v_{sim}$ for the respective gear.

It is therefore possible for example to simulate at a time one or more future speed profiles $v_{sim}$ for raisings of the actual speed $v_{act}$, followed by using a higher transmission mode, i.e. using a higher gear in the gearbox, an open clutch and/or a neutral gear in the gearbox. These one or more future speed profiles $v_{sim}$ will then be evaluated when deciding how the actual speed $v_{act}$ should be controlled, i.e. whether it should be raised to make it possible to use, or prolong use of, the higher transmission mode, as will be described in more detail below.

FIG. 4 is a flowchart for the method according to the present invention. As a first step 401 of the method one or more simulations of future speed profiles $v_{sim}$ are conducted for the section of road ahead of the vehicle 100, basing the simulation for each profile on a gradient of the section of road. As described above, one or more simulations may thus be conducted for raising the actual speed $v_{act}$, followed by changing to a higher transmission mode, e.g. to a higher gear in the gearbox 103, to an open clutch 106 and/or to neutral gear position in the gearbox. In one embodiment the simulations also cater for the higher transmission mode entailing a particular mode of operation which may comprise one or more from among freewheeling, running with maximum torque in the higher transmission mode, running with drag torque in the higher transmission mode and running according to any desired torque profile in the higher transmission mode. The simulation may also cater for one or more vehicle parameters, e.g. the vehicle's weight.

A second step 402 of the method evaluates whether a raising of the vehicle's actual speed $v_{act}$ is appropriate to making it possible to use, or prolong the use of, the higher transmission mode. This evaluation is based on the simulation of the at least one future speed profile $v_{sim}$.

As a third step 403 of the method this evaluation is then used in controlling the actual speed $v_{act}$. A factually supported decision may thus be taken about whether to raise the actual speed $v_{act}$ and whether such a raising actually results in less fuel consumption by making it possible to use, or prolong the use of, the higher transmission mode.

The control of the actual speed $v_{act}$, e.g. a raising of it, is effected in one embodiment by the control system itself. In another embodiment the control system uses a presentation unit to present for the driver a recommendation to raise the actual speed $v_{act}$, followed by a recommendation to change to a higher transmission mode, enabling the driver to choose whether to accept the recommendations presented or not.

The present invention basing the control of the actual speed $v_{act}$ on one or more simulations of future speed profiles $v_{sim}$ makes it possible to achieve fact-supported control. The invention also makes it possible to ensure that repeated upshifts and/or downshifts do not take place, since the simulations are conducted over a longer period of time.

Previous known solutions have not based control on evaluations over longer future speed profiles $v_{sim}$ and have thus often led to upshifts and/or downshifts taking place in different sequences which a driver of the vehicle may well find very disturbing. The present invention therefore provides a form of control of the actual speed $v_{act}$, and hence also of transmission modes used, which for the driver is continuous, intelligent and intuitively comprehensible. This will increase the use of the function and thereby reduce the vehicle's total fuel consumption.

In one embodiment of the invention a gear position for a gearbox 103 forms part of a transmission mode. Here the evaluation of whether a higher transmission mode is usable after a raising of the actual speed $v_{act}$ comprises evaluating whether an upshift to a possible higher gear position is appropriate after the raising. A possible higher gear position may here comprise substantially any gear in the gearbox 103, apart from the lowest gear which is usable at the vehicle's actual speed and/or at an actually demanded engine torque. The invention is however particularly suited to the higher gears in the gearbox 103, especially its highest gear, e.g. a twelfth gear if it has a total of twelve gears for the vehicle's forward propulsion. At least one simulation of a future speed profile $v_{sim}$ is therefore conducted here in cases where the higher transmission mode takes the form of a gear in the gearbox 103.

In one embodiment of the invention, freewheeling forms part of one or more transmission modes. Here the evaluation of whether a higher transmission mode is usable after a raising of the actual speed $v_{act}$ therefore comprises evaluating whether freewheeling is appropriate or not after the raising, in cases where the vehicle's engine is assumed to run idling during the freewheeling.

In one embodiment of the present invention a transmission mode for freewheeling comprises a state of the clutch 106. The evaluation of whether a higher transmission mode is usable after a raising of the actual speed $v_{act}$ therefore here comprises evaluating whether freewheeling by opening the clutch 106 is deemed appropriate after the raising.

Freewheeling by open clutch may therefore be effected by the raising if this is considered appropriate. Opening the clutch may also be regarded as a theoretical/imaginary highest gear for the power train.

In one embodiment of the present invention a transmission mode for freewheeling comprises a state of the clutch in a hybrid vehicle in which an electrical machine/electric motor can propel the vehicle even if the combustion engine is disconnected by the clutch. The evaluation of whether a higher transmission mode is usable after a raising of the actual speed $v_{act}$ therefore here comprises evaluating whether pure electric operation by opening the clutch 106 is deemed appropriate after the raising.

In one embodiment of the invention a transmission mode for freewheeling comprises a neutral gear position for the gearbox 103. The evaluation of whether a higher transmission mode is usable after a raising of the actual speed $v_{act}$ therefore here comprises evaluating whether freewheeling by changing to this neutral gear position is deemed appropriate after the raising. Freewheeling by neutral gear may thus be effected by the raising of the actual speed $v_{act}$ if this is considered appropriate. Using the neutral gear position may also be regarded as a theoretical highest gear for the gearbox 103.

One embodiment evaluates only one of the types of freewheeling for a specific vehicle, in which case only one out of open clutch and neutral gear position will be evaluated, although different ways of effecting freewheeling may be analysed for different vehicles.

These embodiments thus make it possible to achieve very fuel-efficient propulsion of the vehicle by the fact that the raising of the actual vehicle speed $v_{act}$ makes it possible to use, and/or prolongs the use of, open clutch or neutral gear position if this is appropriate for the section of road ahead of the vehicle.

FIG. 5 depicts in a simplified schematic form some advantages of the present invention compared with prior art. In both this and the further drawings the invention is illustrated by using freewheeling as the higher transmission mode. One skilled in the art will however appreciate that the principles in this and the further drawings are also applicable in other higher transmission modes described in this specification. The chain-dotted curve in FIG. 5 is a schematic illustration of freewheeling by use of prior art in a notional driving situation. The broken curve and the continuous curve are respective schematic illustrations of different embodiments for raising the actual vehicle speed $v_{act}$ according to the present invention, followed by freewheeling in the same driving situation. $V_{set}$ is a set speed chosen for a cruise control of the vehicle. $V_{min}$ is a lowest permissible speed.

In previous known solutions the freewheeling begins at a first time $T_1$, after which the actual speed $v_{act}$ during the freewheeling drops until it reaches the lowest permissible speed $v_{min}$ at a second time $T_2$, in the case of prior art freewheeling. The freewheeling then ends according to prior art and the actual speed $v_{act}$ rises again.

In contrast, if deemed appropriate on the basis of one or more simulations of future speed profiles $v_{sim}$ for a section of road ahead, the present invention raises the actual speed $v_{act}$ for a first period $T_{01}$, i.e. the period immediately before the first time $T_1$. After this raising, freewheeling begins at the first time $T_1$, after which the actual speed $v_{act}$ falls during the freewheeling until in various embodiments it reaches at the second time $T_2$ the set speed $v_{set}$ or the lowest permissible speed $v_{min}$.

It is clear from FIG. 5 that the freewheeling known from prior art solutions is usable for a shorter period $T_{prior\_art}$ than the period $T_{higher\_transmode}$ for which it is usable after the raising of the actual speed $v_{act}$ according to the present invention. The present invention also makes it possible for well-supported decisions to be made about whether the raising should be effected or not, since they are based on one or more simulations of future speed profiles $v_{sim}$. The result is a controlled and factually based form of control of the actual speed $v_{act}$ which also reduces fuel consumption through freewheeling taking place for longer periods $T_{high\_transmode}$ than the period $T_{prior\_art}$ of freewheeling according to previous solutions.

The value, i.e. the level, of the lowest permissible speed $v_{min}$, is related in one embodiment to a current actual speed $v_{act}$ for the vehicle. The lowest permissible speed may change dynamically and have different values for different transmission modes.

The value of the lowest permissible speed $v_{min}$ may in one embodiment be determined at least partly on the basis of information related to a cruise control system of said vehicle, e.g. on the basis of a set speed $v_{set}$, i.e. a speed chosen by a driver for a cruise control system, or on the basis of a reference speed $v_{ref}$ which is used by said cruise control system to operate a speed regulator. The determination of the lowest permissible speed $v_{min}$ may also be effected by the cruise control system and be supplied to the system for the present invention.

The lowest permissible speed $v_{min}$ may generally be determined in various different ways. These limit values may for example be fed in by the driver in the form of an actual speed $v_{act}$ for the vehicle or a percentage of a set speed $v_{set}$ for a cruise control system of the vehicle and/or be based on the vehicle's historical driving. The historical driving may for example be catered for by using an adaptive algorithm which is updated during the vehicle's journeys.

As non-limitative examples the lowest permissible speed may have the values $v_{min}$=82 km/h or $v_{min}$=0.98*$v_{set}$ km/h.

In one embodiment of the present invention a raising of the actual speed $v_{act}$ is considered appropriate if the future speed profile $v_{sim}$ is below a highest permissible speed $v_{max}$ along the section of road. This highest permissible speed may then be related to one or more from among a downhill control speed $v_{dhsc}$ for the vehicle, a value of said raising of said actual speed $v_{act}$, a distance from at least one vehicle in front, speed limits and a curvature of said section of road. In one embodiment the highest permissible speed $v_{max}$ is equal to the speed to which the actual speed $v_{act}$ is increased during the raising. When $v_{max}$ depends on distances from vehicles in front, it may be determined at least partly on the basis of a radar-based cruise control which can provide a distance from a vehicle in front. The highest permissible speed $v_{max}$ in one embodiment is given a relatively lower value if the section of road comprises relatively tight or various consecutive bends.

In one embodiment of the present invention a raising of the actual speed $v_{act}$ is considered appropriate on the basis of a predicted period of use $t_{high\_transmode}$ for said highest transmission mode after the raising. This predicted use period is typically determined on the basis of the at least one future speed profile $v_{sim}$ and the lowest permissible speed $v_{min}$, e.g. in such a way that the end point T2 of the predicted use period coincides with the point where the speed profile $v_{sim}$ coincides with the lowest permissible speed $v_{min}$.

For example, the raising may be considered appropriate in the evaluation of whether the predicted period $t_{high\_transmode}$ for the use of the highest transmission mode by said raising is longer than or equal to a predetermined period $t_{min}$. This embodiment is illustrated schematically in FIGS. 6a and 6b, in both of which the predicted use time $t_{high\_transmode}$ for the higher transmission mode is longer than the predetermined period $t_{min}$, in which case freewheeling is considered for example appropriate and is applied.

In one embodiment of the invention the length of the predetermined period $t_{min}$ is determined in such a way as to avoid inconsistent control of the vehicle, while at the same time keeping the fuel consumption as low as possible. Here the predetermined period $t_{min}$ is therefore set long enough to ensure for example that freewheeling is not activated for shorter periods, in order to avoid disturbance caused by repeated activations and inactivations of, for example, freewheeling. The predetermined period $t_{min}$ does however need to be short enough to ensure for example that freewheeling is activated when it actually saves fuel and does not irritate the driver.

In one embodiment of the present invention a raising of the actual speed $v_{act}$ is considered appropriate if the future speed profile $v_{sim}$ steadily decreases along the portion $T_1$-$T_2$ of the section of road where the higher transmission mode is used. This embodiment is illustrated schematically in FIGS. 6a and 6b. In this embodiment the future speed profile $v_{sim}$ according to FIG. 6a, which during the period $T_1$-$T_2$ when the higher transmission mode is used has a steadily decreasing profile and also a relatively low deceleration, would be considered appropriate for use of the higher transmission mode. In this embodiment, however, the future speed profile $v_{sim}$ according to FIG. 6b, which during the period $T_1$-$T_2$ when the higher transmission mode is used has a more oscillating or wavy profile and at least partly relatively high deceleration, would be considered inappropriate for use of the raising followed by the high transmission mode. The future speed profile $v_{sim}$ in one embodiment may therefore be considered inappropriate if its deceleration during the period $T_1$-$T_2$ when the higher transmission mode is used is too great, i.e. if the acceleration is less than a smallest permissible acceleration $a_{min}$ during the period $T_1$-$T_2$. The future speed profile $v_{sim}$ in one embodiment is considered inappropriate if it does not have for this period $T_1$-$T_2$ a steadily decreasing profile.

Similarly it is possible in one embodiment of the invention for a raising in the actual speed $v_{act}$ to be considered appropriate if the future speed profile $v_{sim}$ has acceleration greater than a smallest permissible acceleration a along the section of road. Here the smallest permissible acceleration may have a constant value, e.g. −0.1 km/h/s.

In one embodiment of the present invention the raising of the actual speed $v_{act}$ is considered appropriate if the higher transmission mode can be used for a predetermined period $t_{lim}$ which is longer as a result of said raising than without it, i.e. if $(T_{high\_transmode} - T_{prior\_art}) \geq t_{lim}$. This is illustrated schematically in FIG. 7, depicting a future speed profile $v_{sim}$ according to the present invention with a simulated raising of the actual speed $v_{act}$. Also depicted is a future speed profile $v_{prior\_art}$ in which no raising of the actual speed $v_{act}$ is simulated. As may be seen in the diagram, the result is a period $T_{prior\_art}$ for possible use of the higher transmission mode without raising, which corresponds to the period when the speed profile $v_{prior\_art}$ is greater than the lowest permissible speed $v_{min}$.

The result for the speed profile $v_{sim}$ according to the present invention, which comprises a raising, is a period $T_{high\_transmode}$ for possible use of the higher transmission mode, which period similarly corresponds to that where the speed profile $v_{sim}$ is greater than the lowest permissible speed $v_{min}$. The period for use of the higher transmission mode according to the present invention $T_{high\_transmode}$ is longer than corresponding periods where there is no raising of the actual speed $v_{act}$. If the difference between the periods is at least equal to a predetermined period $t_{lim}$, the raising is considered appropriate, i.e. if $(T_{high\_transmode} - T_{prior\_art}) \geq t_{lim}$.

In one embodiment the length of the predetermined period $t_{lim}$ is determined in such a way as to result in significantly longer periods in the higher transmission mode than would be the case without raising. An example of such a lengthening is 15 seconds, i.e. $t_{lim} = 15$ s.

In one embodiment of the present invention the evaluation of whether the raising is appropriate comprises comparing a first simulation of the future speed profile $v_{sim\_inc\_1}$ which comprises a first raising $v_{inc\_1}$ of the actual speed $v_{act}$, with at least a second simulation of the future speed profile $v_{sim\_inc\_2}$ which comprises a second raising $v_{inc\_2}$ of the actual speed $v_{act}$. The decision to raise or not is made by comparing these simulations $v_{sim\_inc\_1}$, $v_{sim\_inc\_2}$. The raising should typically be effected according to the simulation which results in the most advantageous subsequent use of the higher transmission mode and when the simulation shows that the highest transmission mode can be used for at least a predetermined period $t_{min}$ as a result of the raising.

This is illustrated schematically in FIG. 8a, in which a first simulation of a future speed profile $v_{sim\_inc\_1}$ which comprises a first raising $v_{inc\_1}$ results in a longer possible period of use $T_{high\_transmode\_inc\_1}$ of the higher transmission mode than the period $T_{high\_transmode\_inc\_2}$ which would be possible according to the second simulation which comprises a second raising $v_{inc\_2}$. Moreover, the higher transmission mode according to the first simulation of the future speed profile $v_{sim\_inc\_1}$ is usable for longer than a predetermined period $t_{min}$, as a result of the raising. Here the first simulation of the future speed profile $v_{sim\_inc\_1}$ is therefore the most advantageous and should be chosen, in which case this raising $v_{inc\_1}$ of the actual speed $v_{act}$ is considered appropriate.

FIG. 8a illustrates two simulations for two different raisings, although similar simulations may be conducted for a larger number of different raisings, followed by their evaluation with a view to spotting and adopting the most advantageous simulation in which the higher transmission mode is usable for longer than a predetermined period $t_{min}$ and which comprises an appropriate raising of the actual speed $v_{act}$.

In one embodiment of the present invention the evaluation of whether the raising is appropriate comprises comparing a simulation of the future speed profile $v_{sim\_now}$ in which the actual speed $v_{act}$ is raised at a current time with at least one simulation of a speed profile $v_{sim\_later}$ in which the actual speed $v_{act}$ is raised at a later time. The decision to raise or not is then made by comparing these two simulations $v_{sim\_now}$, $v_{sim\_later}$ which comprise chronologically separate raisings of the actual speed $v_{act}$. The raising should typically be effected according to the simulation which results in the most advantageous use of the higher transmission mode. If the simulation with the later raising $v_{sim\_later}$ results in a longer time for the use of the higher transmission mode than the simulation with the earlier raising $v_{sim\_now}$, the system quite simply refrains from controlling/posting the speed raising and evaluates it again when the next simulation round has been completed, which may for example be one second later. If the simulation $v_{sim\_now}$ with raising at the current time then results in a longer time for the use of the higher transmission mode than the simulation $v_{sim\_later}$ would, the raising is then posted.

This is illustrated schematically in FIG. 8b, in which a simulation of a future speed profile $v_{sim\_later}$ which comprises a later raising results in a longer possible use $T_{high\_transmode\_later}$ of the higher transmission mode than the use period $T_{high\_transmode\_now}$ which would be possible according to the simulation $v_{sim\_now}$ which comprises a raising at the current time. Here the simulation of the future speed profile $v_{sim\_later}$ with the later raising is thus the most advantageous and should be adopted, in which case this raising of the actual speed $v_{act}$ is considered appropriate if the use period $T_{high\_transmode\_later}$ is longer than the predetermined period $t_{min}$. In practice this may be implemented in such a way that the speed raising is not posted as long as $T_{high\_transmode\_later} > T_{high\_transmode\_now}$, so the speed raising is only posted when $T_{high\_transmode\_later} < T_{high\_transmode\_now}$ and the use period $T_{high\_transmode\_now}$ is longer than the predetermined period $t_{min}$. This implementation is possible in that the simulated speed profiles are updated (re-evaluated) on board the vehicle at a certain rate, e.g. at the rate of 1 Hz.

FIG. 8b illustrates two simulations with raisings at different times, although similar simulations may be conducted for a larger number of times, followed by their evaluation with a view to spotting and adopting the most advantageous which comprises an appropriate raising of the actual speed $v_{act}$.

In one embodiment of the present invention the embodiments illustrated in FIGS. 8a and 8b may be combined so that a number of simulations comprising one or more different raisings at one or more different times are performed. The most advantageous simulation can then be identified, whereupon the most advantageous raising may also be identified and be used in order to maximize the advantages afforded by the subsequent use of the higher transmission mode.

In one embodiment a simulation (corresponding to a mode of operation) is considered the most advantageous if it results in lower energy consumption than other modes of operation/simulations. This criterion may for example be applied to choose a most advantageous simulation from among the various different simulations, for various different times, for various different raisings or for various different raisings at various different times. If any of the simulations which raise the actual speed $v_{act}$ at a current time is the most advantageous from the energy perspective, a speed raising in accordance with that simulation is posted. If a simulation which raises the actual speed $v_{act}$ later or does not raise it at all is the most advantageous from the energy perspective, the decision made is not to post any speed raising in this situation.

In one embodiment of the present invention the at least one future speed profile $v_{sim}$ may also comprise a simulation of a maintaining of the actual speed $v_{act}$ for a first period T0-T1, followed by a use of said higher transmission mode. Here at least two future speed profiles $v_{sim}$ therefore need to be simulated, at least one of the simulations comprising a raising of the actual speed $v_{act}$, while at least one comprises the maintaining of the actual speed $v_{act}$ for the first period T0-T1, followed by the use of the higher transmission mode.

One skilled in the art will appreciate that a method for choice of transmission mode according to the present invention may also be implemented in a computer program which, when executed in a computer, causes the computer to conduct the method. The computer program usually takes the form of a computer program product 903 which comprises a suitable digital storage medium on which the computer program is stored. Said computer-readable medium comprises a suitable memory, e.g. ROM (read-only memory), PROM (programable read-only memory), EPROM (erasable PROM), flash memory, EEPROM (electrically erasable PROM), a hard disc unit, etc.

FIG. 9 depicts schematically a control unit 900 provided with a calculation unit 901 which may take the form of substantially any suitable type of processor or microcomputer, e.g. a circuit for digital signal processing (digital signal processor, DSP), or a circuit with a predetermined specific function (application specific integrated circuit, ASIC). The calculation unit 901 is connected to a memory unit 902 which is situated in the control unit 900 and which provides the calculation unit with, for example, the stored program code and/or stored data which the calculation unit needs to enable it to do calculations. The calculation unit is also adapted to storing partial or final results of calculations in the memory unit 902.

The control unit 900 is further provided with respective devices 911, 912, 913, 914 for receiving and sending input and output signals. These input and output signals may comprise waveforms, pulses or other attributes which the input signal receiving devices 911, 913 can detect as information and which can be converted to signals which the calculation unit 901 can process. These signals are then supplied to the calculation unit. The output signal sending devices 912, 914 are arranged to convert signals received from the calculation unit 901, in order to create, e.g. by modulating them, output signals which can be conveyed to other parts of the vehicle and/or other systems on board.

Each of the connections to the respective devices for receiving and sending input and output signals may take the form of one or more from among a cable, a data bus, e.g. a CAN (controller area network) bus, a MOST (media orientated systems transport) bus or some other bus configuration, or a wireless connection. One skilled in the art will appreciate that the aforesaid computer may take the form of the calculation unit 901 and that the aforesaid memory may take the form of the memory unit 902.

Control systems in modern vehicles generally comprise a communication bus system consisting of one or more communication buses for connecting together a number of electronic control units (ECUs), or controllers, and various components on board the vehicle. Such a control system may comprise a large number of control units and the responsibility for a specific function may be divided between two or more of them. Vehicles of the type here concerned are therefore often provided with significantly more control units than depicted in FIG. 7, as one skilled in the art will surely appreciate.

In the embodiment depicted, the present invention is implemented in the control unit 900 but might also be implemented wholly or partly in one or more other control units already on board the vehicle or a control unit dedicated to the present invention.

One aspect of the invention proposes a system adapted to making it possible to use, or prolong a use of, the higher transmission mode. The system comprises a simulation unit adapted to simulating at least one future speed profile $v_{sim}$ for an actual speed for the vehicle along a section of road ahead. The simulation is here conducted when the section of road is still ahead of the vehicle. The simulation of the at least one future speed profile $v_{sim}$ is based on information related to a gradient of the section of road.

The system comprises also an evaluation unit adapted to evaluating whether a raising of an actual speed $v_{act}$ for the vehicle is appropriate to achieving a possibility of using, or prolonging a use of, the higher transmission mode, which evaluation is based on the simulation of the at least one future speed profile $v_{sim}$. The system comprises also a use unit adapted to using the evaluation during control of the actual speed $v_{act}$.

In one embodiment of the invention the raising of the actual speed $v_{act}$ and the transmission mode to be used thereafter are controlled by the vehicle's control system itself.

In another embodiment of the invention, directed towards providing the vehicle's driver with information to support decisions during its driving, the use unit comprises a presentation unit adapted to presenting a raising of the actual speed $v_{act}$, and the higher transmission mode. The decision here is thus about whether the raising should be effected and which transmission mode should be used by the driver.

The presentation unit is preferably integrated with, or close to, a user interface on board the vehicle which makes it easy for the driver to understand the presentation of the raising and the transmission mode.

The presentation of the indicators may take a variety of different forms, e.g. one or more indicators for raisings and transmission modes, such as arithmetical signs, numerals, letters, symbols, patterns, diagrams, colors, animations and sounds.

The system, i.e. the simulation unit, the evaluation unit, the use unit and, in certain embodiments, the presentation unit, is intended to be able to conduct all of the embodiments described above of the method according to the present invention.

One skilled in the art will of course appreciate that speeds and speed limit values indicated in this specification have equivalents and can be converted to engine speeds and engine speed limit values or torques and torque limit values. One skilled in the art will also appreciate that there is a very well-known relationship between distances, times and speeds, so the times and periods of time herein indicated have equivalents in terms of locations and distances.

One skilled in the art will also appreciate that the above system may be modified according to the various embodiments of the method according to the invention.

The invention relates also to a motor vehicle 100, e.g. a truck or a bus, provided with at least one system for choice of transmission mode according to the invention.

The present invention is not restricted to its embodiments described above but relates to and comprises all embodiments within the protective scope of the attached independent claims.

The invention claimed is:

1. A method for making it possible to use, or prolong a use of, a higher transmission mode in a vehicle, said method comprising:
    simulation of at least one future speed profile for an actual speed for said vehicle along a section of road ahead of said vehicle, which simulation is conducted at a time when said section of road is still ahead of said vehicle, and is based at least on:

information related to a gradient of said section of road, and an assumption of an at least partial use of said higher transmission mode, said higher transmission mode being an upshift or a freewheeling from a transmission mode used in said vehicle at a time of said simulation;

evaluation of whether a raising of an actual speed for said vehicle is appropriate in order to achieve said making possible or prolongation, which evaluation is based on said simulation of at least one future speed profile; and use of said evaluation during control of said actual speed.

2. The method according to claim 1, in which said at least one future speed profile comprises at least one simulation of a raising of said actual speed.

3. The method according to claim 2, in which said at least one future speed profile comprises at least one simulation of said raising being effected in a lower transmission mode and said raising being followed by a use of said higher transmission mode, wherein said lower transmission mode is at a gear position for a transmission of said vehicle that is lower than a gear position of the transmission at the higher transmission mode.

4. The method according to claim 3, in which said lower transmission mode is a transmission mode used at the time when said simulation is conducted.

5. The method according to claim 1, in which said at least one future speed profile comprises at least one simulation of a maintaining of said actual speed for a first period, followed by a use of said higher transmission mode.

6. A method according to claim 1, in which a use of said higher transmission mode comprises a mode of operation from among the following:
   freewheeling,
   operating with maximum torque in said higher transmission mode,
   operating with drag torque in said higher transmission mode, and
   operating according to any desired torque profile in said higher transmission mode.

7. A method according to claim 1, in which said gradient is obtained from map data in combination with positioning information.

8. A method according to claim 1, in which said gradient is determined on the basis of any of the following:
   radar-based information,
   camera-based information,
   information obtained from other vehicles than said vehicle,
   gradient information and positioning information stored previously on board the vehicle, and
   information obtained from traffic systems related to said section of road.

9. A method according to claim 1, in which said evaluation of whether said raising of said actual speed is appropriate is based on a predicted period of use for said higher transmission mode.

10. A method according to claim 9, in which said predicted use period is determined on the basis of said at least one future speed profile and of a lowest permissible speed.

11. A method according to claim 10, in which a value for said lowest permissible speed is determined at least partly on the basis of information related to a cruise control system on board said vehicle.

12. A method according to claim 10, in which a value for said lowest permissible speed is related to a current actual speed for said vehicle.

13. A method according to claim 10, in which a value for said lowest permissible speed changes dynamically.

14. A method according to claim 10, in which a value for said lowest permissible speed has different values for different transmission modes.

15. A method according to claim 10, in which a value for said lowest permissible speed depends on information about said section of road ahead.

16. A method according to claim 1, in which a use of said higher transmission mode comprises freewheeling of said vehicle which is achieved either by:
   an open clutch of said vehicle, or by
   a neutral gear position for a gearbox of said vehicle.

17. A method according to claim 1, in which said use of said evaluation during control of said actual speed is effected by a control unit of said vehicle raising said actual speed for said vehicle.

18. A method according to claim 1, in which use of said evaluation during control of said actual speed is effected by a control unit of said vehicle choosing to present for a driver of said vehicle information corresponding to recommendations to raise said actual speed and then change to a higher transmission mode.

19. A method according to claim 1, in which said evaluation comprises:
   a comparison of at least one simulation of said future speed profile which comprises said raising at a current time with at least one simulation of a future speed profile which comprises said raising at a later time; and
   deciding whether said raising of said actual speed according to the most advantageous of said at least one simulation of said future speed profile which comprises said raising at a current time and at least one simulation of a future speed profile which comprises said raising at a later time can be considered appropriate.

20. The method according to claim 19, in which a rising is considered the most advantageous if it results in a lower energy consumption than other raisings.

21. A method according to claim 1, in which said raising of said actual speed is considered appropriate in said evaluation if said higher transmission mode can be used for a predetermined period which is longer as a result of said raising than without said raising.

22. A method according to claim 1, in which said raising of said actual speed is considered appropriate in said evaluation if said higher transmission mode can be used for a predetermined period as a result of said raising.

23. A method according to claim 20, in which said raising of said actual speed is considered appropriate if in addition at least one of the following requirements is fulfilled for a portion of said section of road when use of said higher transmission mode is simulated:
   said future speed profile being below a highest permissible speed along said portion of said section of road,
   said future speed profile having an acceleration greater than a smallest permissible acceleration along said portion of said section of road, and
   said future speed profile steadily decreasing along said portion of said section of road.

24. A method according to claim 23, in which a value for said highest permissible speed is related to one of the following:
   a downhill control speed for said vehicle,
   a value for said raising of said actual speed,
   a distance from at least one vehicle in front, and
   a curvature of said section of road.

25. A method according to claim 1, in which the future speed profile which results in the lowest energy consumption is considered appropriate in said evaluation.

26. A method according to claim 1, in which said raising of said actual speed is considered appropriate in said evaluation if said higher transmission mode results in a lower energy consumption through said raising than without said raising.

27. A computer program product for making it possible to use, or prolong a use of, a higher transmission mode in a vehicle, said computer program product located on a non-transitory computer readable medium, comprising instructions for operation by a computing device, said instructions comprising:
  instructions configured for simulation of at least one future speed profile for an actual speed for said vehicle along a section of road ahead of said vehicle, which simulation is conducted at a time when said section of road is still ahead of said vehicle, and is based at least on:
    information related to a gradient of said section of road, and
    an assumption of an at least partial use of said higher transmission mode, said higher transmission mode being an upshift or a freewheeling from a transmission mode used in said vehicle at a time of said simulation;
  instructions configured for evaluation of whether a raising of an actual speed for said vehicle is appropriate in order to achieve said making possible or prolongation, which evaluation is based on said simulation of at least one future speed profile; and
  instructions configured for use of said evaluation during control of said actual speed.

28. A control system adapted to making it possible to use, or prolong a use of, a higher transmission mode in a vehicle, comprising:
  a simulation unit configured for simulating at least one future speed profile for an actual speed for said vehicle along a section of road ahead of said vehicle, which simulation is conducted at a time when said section of road is still ahead of said vehicle, and is based at least on:
    information related to a gradient of said section of road, and
    an assumption of an at least partial use of said higher transmission mode, said higher transmission mode an upshift or a freewheeling from a transmission mode used in said vehicle at a time of said simulation;
  an evaluation unit configured for evaluating whether a raising of an actual speed for said vehicle is appropriate to achieving said making possible or prolongation, which evaluation is based on said simulation of at least one future speed profile; and
  a use unit configured for using said evaluation during control of said actual speed.

29. A control system adapted to making it possible to use, or prolong a use of, a higher transmission mode in a vehicle, said control system comprising:
  at least one electronic storage device;
  at least one computing processor device; and
  computer program instruction code stored in a non-transitory computer readable medium on one or more of said electronic storage devices, wherein, when executed by said one or more computing processor devices, said computer program instruction code is configured to cause said one or more computing processor devices to:
  simulate at least one future speed profile for an actual speed for said vehicle along a section of road ahead of said vehicle, which simulation is conducted at a time when said section of road is still ahead of said vehicle, and is based at least on:
    information related to a gradient of said section of road, and
    an assumption of an at least partial use of said higher transmission mode, said higher transmission mode being an upshift or a freewheeling from a transmission mode used in said vehicle at a time of said simulation;
  evaluate whether a raising of an actual speed for said vehicle is appropriate to achieving said making possible or prolongation, which evaluation is based on said simulation of at least one future speed profile; and
  use said evaluation during control of said actual speed.

* * * * *